`US007397475B2`

(12) United States Patent
Shen et al.

(10) Patent No.: US 7,397,475 B2
(45) Date of Patent: Jul. 8, 2008

(54) INTERACTIVE ATLAS EXTRACTED FROM VOLUME DATA

(75) Inventors: Hong Shen, Plainsboro, NJ (US); Shuping Qing, Princeton, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 256 days.

(21) Appl. No.: 11/203,792

(22) Filed: Aug. 15, 2005

(65) Prior Publication Data

US 2006/0062425 A1 Mar. 23, 2006

Related U.S. Application Data

(60) Provisional application No. 60/606,633, filed on Sep. 2, 2004.

(51) Int. Cl.
*G06T 15/00* (2006.01)
(52) U.S. Cl. .................... 345/420; 345/424; 600/407
(58) Field of Classification Search .............. 345/420, 345/424; 600/407
See application file for complete search history.

(56) References Cited

U.S. PATENT DOCUMENTS 5,548,694 A * 8/1996 Frisken Gibson ........... 345/424

6,236,875 B1 * 5/2001 Bucholz et al. ............. 600/407

OTHER PUBLICATIONS

Singh et al., "Real-Time Volume Manipulation", 2003, Volume Graphics, The Eurogaphics Association, pp. 45-52 and 164.*
Prohaska et al., "Fast Visualization of Plane-Like Structures in Voxel Data", 2002, IEEE Visualization.*
Takahashi et al., "Topological Volume Skeletonization Using Adaptive Tetrahedralization", 2004, IEEE, Proceedings of the Geometric Modeling and Processing.*

* cited by examiner

*Primary Examiner*—Phu K Nguyen (57) ABSTRACT

A computer-implemented method for building an atlas includes providing a volume data for a plurality of bones, segmenting, individually, the plurality of bones from the volume data, storing locations of a plurality of voxels for each of the plurality of bones, wherein each of the plurality of bones is registered with a dedicated list of locations, wherein the locations are locations in a coordinate system of the volume data, selecting one or more of the plurality of bones, forming a selected structure, and rendering the selected structure in the coordinate system of the volume data according to the dedicated list of locations of each of the plurality of bones in the selected structure, wherein a rendering is displayed by a display.

17 Claims, 6 Drawing Sheets

INTERACTIVE ATLAS EXTRACTED FROM VOLUME DATA

This application claims priority to U.S. Provisional Application Ser. No. 60/606,633, filed on Sep. 2, 2004, which is herein incorporated by reference in its entirety.

BACKGROUND OF THE INVENTION

1. Technical Field

The present invention relates to medical image analysis, and more particularly to a system and method for an interactive skeletal atlas from volume data.

2. Discussion of Related Art

With the development of multi-slice Computed Tomography (CT) scanners, Computer Aided Diagnosis (CAD) methods have been developed to provide functionalities that make the reading of the volume data more convenient and effective.

An example of anatomy of interest is the thoracic cage including the complete lung area and a portion of the lower abdomen. The thoracic cage provides mechanical support and protection to the chest cavity that contain important organs. Further, the ribs and vertebras are also prone to diseases. There are physically disabling diseases such as osteoporosis and spine stenosis that affect millions of people; Ribs and vertebras are also common sites of metastasis, the detection of which will completely change the cancer staging and treatment of a patient.

Figure 1A:
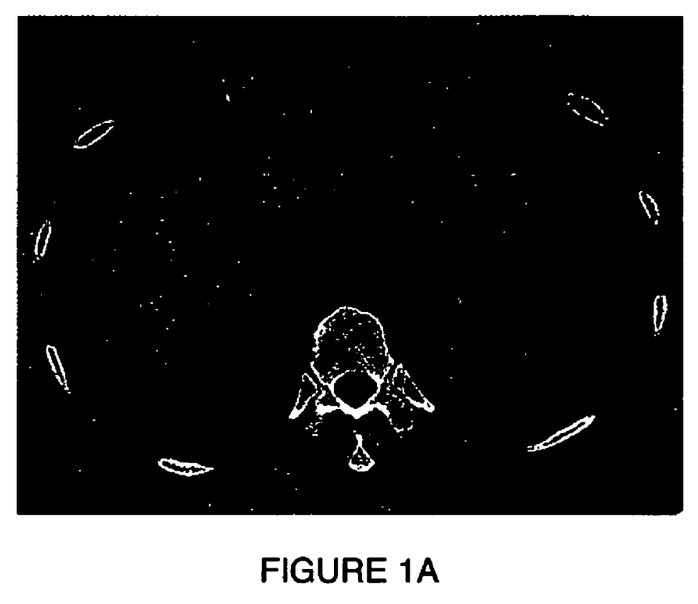
FIGS. 1A-B are samples of 2D axial slice images from the volume scan of a CT chest scan.
Figure 1B:
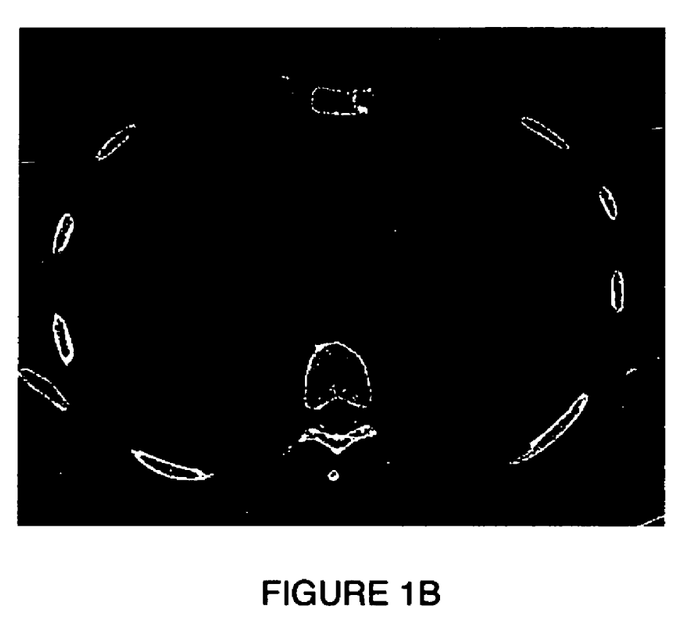

The thoracic cage is composed of pairs of ribs, the spine and the sternum. The rib and vertebra structures are highly ordered and symmetrical, and we observed that each pair of ribs roughly forms a plane. The shapes and structures of the thoracic cage are highly complex and variant, making observation through the 2-dimensional (2D) axial slices difficult. For example, as shown in FIG. 1A-B, the rib planes make large angle with the axial plane, and the physician can only see cross-sections of the ribs in the axial plane. It is difficult for the physicians to know which rib has the observed pathology, and rib counting is a tedious job. The complexity of the vertebra makes it even hard to imagine the shape and pathology through the viewing of 2D axial slices.

Therefore, a need exists for a system and method for an interactive atlas from volume data.

SUMMARY OF THE INVENTION

According to an embodiment of the present disclosure a computer-implemented method for building an atlas includes providing a volume data for a plurality of bones, segmenting, individually, the plurality of bones from the volume data, storing locations of a plurality of voxels for each of the plurality of bones, wherein each of the plurality of bones is registered with a dedicated list of locations, wherein the locations are locations in a coordinate system of the volume data, selecting one or more of the plurality of bones, forming a selected structure, and rendering the selected structure in the coordinate system of the volume data according to the dedicated list of locations of each of the plurality of bones in the selected structure, wherein a rendering is displayed by a display.

The rendering is a surface rendering or a volume rendering.

The method includes segmenting a first bone using a tracing method, and segmenting a second bone using a level set method.

A rendering of the selected structure is the atlas, the method further including comparing the atlas to a previously extracted atlas of a same patient.

The method includes determining a rendering of the selected structure to have a pathology, and storing the locations of the plurality of voxels corresponding to the selected structure selected structures in a database of selected structures having the pathology or a plurality of pathologies.

Accordingly to an embodiment of the present disclosure, a program storage device is provided, readable by machine, tangibly embodying a program of instructions executable by the machine to perform method steps for building an atlas. The method includes providing a volume data for a plurality of bones, segmenting, individually, the plurality of bones from the volume data, storing locations of a plurality of voxels for each of the plurality of bones, wherein each of the plurality of bones is registered with a dedicated list of locations, wherein the locations are locations in a coordinate system of the volume data, selecting one or more of the plurality of bones, forming a selected structure, and rendering the selected structure in the coordinate system of the volume data according to the dedicated list of locations of each of the plurality of bones in the selected structure, wherein a rendering is displayed by a display.

According to an embodiment of the present disclosure, a computer-implemented method for visualization of skeletal structures includes providing a volume data of a skeletal structure, rendering a three-dimensional view of the skeletal structure in a first window, selecting, individually, at least one bone of the skeletal structure forming a selected structure, and rendering a three-dimensional view the selected structure in a second window.

The three-dimensional view of the skeletal structure is a surface rendering and the three-dimensional view of the selected structure is a surface rendering. The three-dimensional view of the skeletal structure is a surface rendering and the three-dimensional view of the selected structure is a volume rendering. The three-dimensional view of the skeletal structure is a volume rendering and the three-dimensional view of the selected structure is a surface rendering. The three-dimensional view of the skeletal structure is a volume rendering and the three-dimensional view of the selected structure is a volume rendering.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present disclosure, a 3D atlas of a thoracic cage is extracted from chest volume data, e.g., a computed tomography (CT) scan or a magnetic resonance imaging (MRI) scan. The atlas allows a user to interactively view, in 3D, bone pieces, including each rib or vertebra separately, or arbitrary combinations of other bone pieces while maintaining a spatial relationship between the pieces.

For example, all the bone pieces of a thoracic cage are connected together. The pieces are displayed individually, each displayed piece being selected by the user. The user can view each individual bone piece in a 3D representation of 2D space (e.g., slices of the volume data), looking at all surfaces without being blocked by neighboring bones.

All the bone pieces, including the ribs and vertebras are extracted individually from the chest volume data. The ribs are extracted using a tracing based approach, but can be extracted using other methods. The tracing base method uses a seed point for each rib (e.g., a user selected point within a rib), and traces the edges of the rib using, for example, boundary detection.

The vertebra segmentation is based on a level set method augmented with global prior knowledge, e.g., shape and high level features including the spinal canal for vertebra and planes between ribs and vertebra. The level set method represents a closed curve in the plane as the zero level set of the two-dimensional slices of the volume data, and manipulates the closed curve through the volume data.

The segmentation results of all bone pieces using one or more segmentation methods form the basis of the 3D atlas. The locations of the voxels contained in each piece of bone are stored in a dedicated list for that bone piece.

The surface of each bone piece is constructed from the segmentation result. For example, a triangulation method can be applied to reduce the surface into a triangular surface representation. However, other methods can be used such, surface spline. All surfaces are visualized in a 3D window. The spatial relations of the surfaces are maintained since all the locations of the surface points are in the same coordinate system with the volume data. Shown in FIGS. 2A-D are the several views of the surface rendering of an atlas. FIGS. 2A-D are views of the same visualization. The vertebrae and the ribs may be rendered in different colors so that boundaries between each vertebra and the pair of ribs connected to it can be recognized.

By segmenting each bone piece individually, the user can select to view each bone piece separately, without the blocking or interference of neighbor bones. By using rotation and zoom functions of a 3D display system (for example, see FIG. 6), each rendered detail of the surface shape at every location of the bone piece is viewable. Thus, in application, shape abnormalities in the bone pieces may be identified. Further, the user can arbitrarily choose to display any combination of bone pieces. The 3D display system maintains and accurately presents the spatial relationships of the selected bone pieces.

Figure 2A:
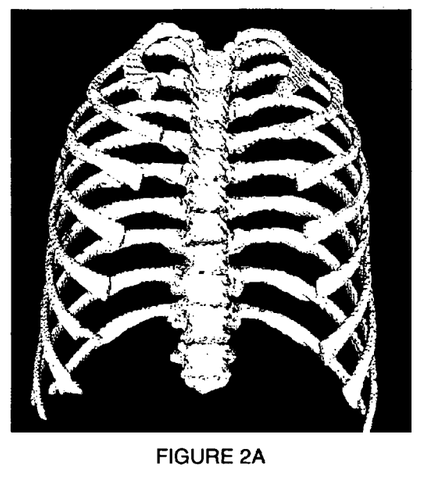
FIGS. 2A-D are surface renderings of the same visualization of a whole thoracic cage atlas according to an embodiment of the present disclosure.
Figure 2B:
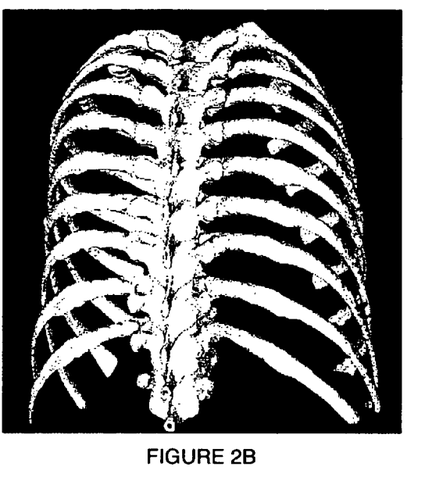
Figure 2C:
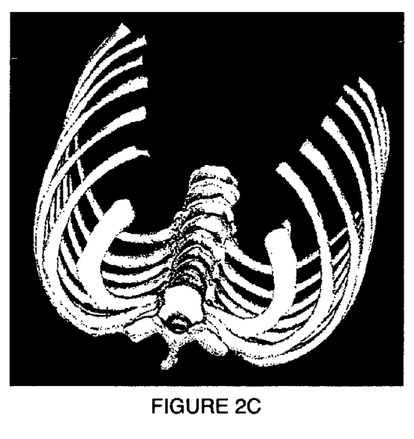
Figure 2D:
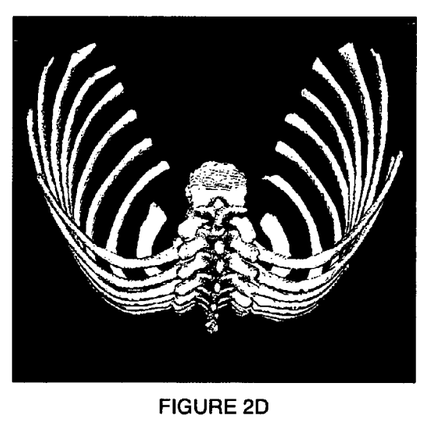
Figure 3A:
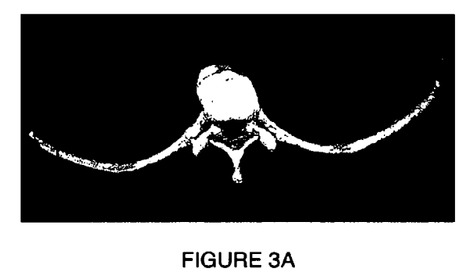
FIGS. 3A-F are surface renderings of partial atlases of bone pieces selected by user according to an embodiment of the present disclosure.
Figure 3B:
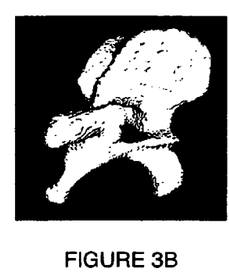
Figure 3C:
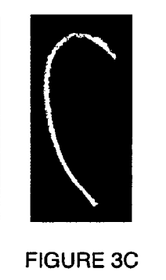
Figure 3D:
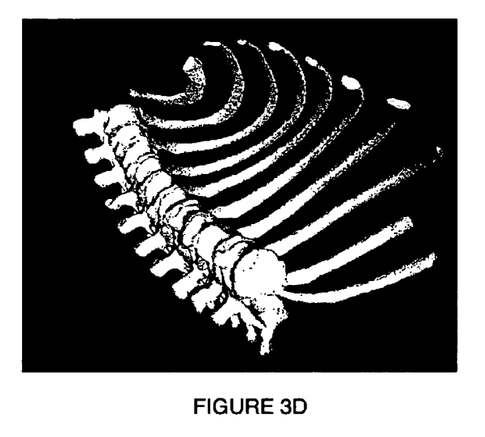
Figure 3E:
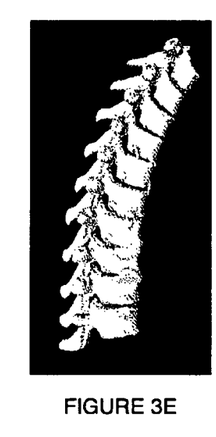
Figure 3F:
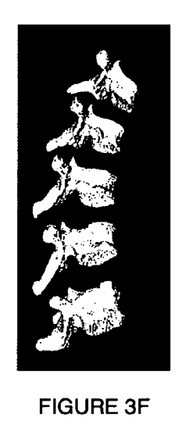
Figure 4A:
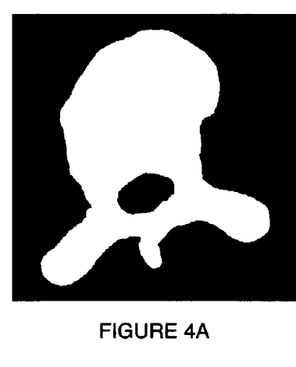
FIGS. 4A-C are volume renderings of individual bone pieces according to an embodiment of the present disclosure.
Figure 4B:
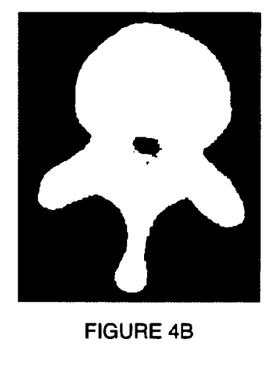
Figure 4C:
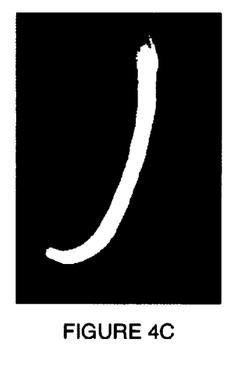

Many diseases are due to the change of relative positions of the neighboring bone pieces, and the user can clearly see this change from the partial atlas. Shown in FIGS. 3A-F are examples of the partial atlas. FIG. 3A is a vertebra with its connected pair of ribs. FIG. 3B is a single vertebra. FIG. 3C is a single rib. FIG. 3D shows all vertebrae with all left side ribs. FIG. 3E illustrates all vertebrae. FIG. 3F shows every other vertebra. The selection of the bone pieces is performed by, for example, clicking on individual bone pieces in a display window of the whole atlas (an atlas window), for example, as shown in FIG. 2A. For example, a cursor is moved over a bone piece in the whole atlas and a selection is made, e.g., by mouse click. Each voxel on the 3D display is registered with the segmentation result, individual bone pieces. Other methods for bone piece selection are possible, for example, a list of the names of bone pieces can be provided, wherein a user selects the names of bone pieces to be displayed. In another example, bone pieces in the whole atlas that are not desired are selected to remove the bone pieces from the view of the atlas. In a preferred embodiment the selected bone pieces are displayed in a separate selection window, for example, as shown in FIG. 3A-3F, while the whole atlas is viewable in the atlas window, for example, as shown in FIG. 2B.

Volume rendering is needed for examining pathologies inside the bone pieces, such as tumors and internal holes. The volume rendering of an object differs from surface rendering in that it reflects the intensities of internal structures rather than just the shape of the surface. It is a projection of the intensities of the 3D voxels into a 2D display interface. The structures, such as tumors, along the projection line can be seen since the structures before it is made somewhat transparent. Each pixel on the 2D display window is the accumulated intensities of all the 3D voxels on the projection path. Comparing to surface rendering, volume rendering is time consuming. Therefore, for the visualization of the whole atlas or combinations of several bone pieces surface rendering may be desired. Volume rendering may be selected by the user, for example, for the display of a selection bone piece. Because bone pieces are individually segmented according to an embodiment of the present disclosure, an individual bone may be selected and viewed.

The interactive atlas is different from an atlas presented in a textbook. It is specific to the human being whose chest was scanned. It represents real data that reflects each patient's own bone conditions, shapes and internal structures. The atlas serves as a vivid, interactive, and personalized report for the patient. All abnormalities are recorded and can be examined. The rendered atlas and/or selected bone pieces can be recorded as a record of diseases and pathologies. Arrows and other graphs can be added to the rendered views to indicate locations of abnormalities, so they can be read at a glance. An atlas can be compared to a previously extracted and stored atlas of the same patient to show changes of each bone piece as well as in the relative position.

Stored atlases and/or selected structures can be used in medical education. For example, the selected structure can be stored in a database of selected structures having a desired pathology or a plurality of pathologies. The interactive atlas, e.g., of a thoracic cage, is flexible; multiple views can be adopted and visualization tools can be used, for example, to markup a rendered atlas. Multiple atlases from different patients can offer examples of variations of the real human bones from the average structure prototype. Further, it can be shared with as many students as needed. Each student can have numerous different models to examine, and at any time.

Other atlas can be built for bones other than thoracic cage, e.g., a whole human skeleton.

Figure 5:
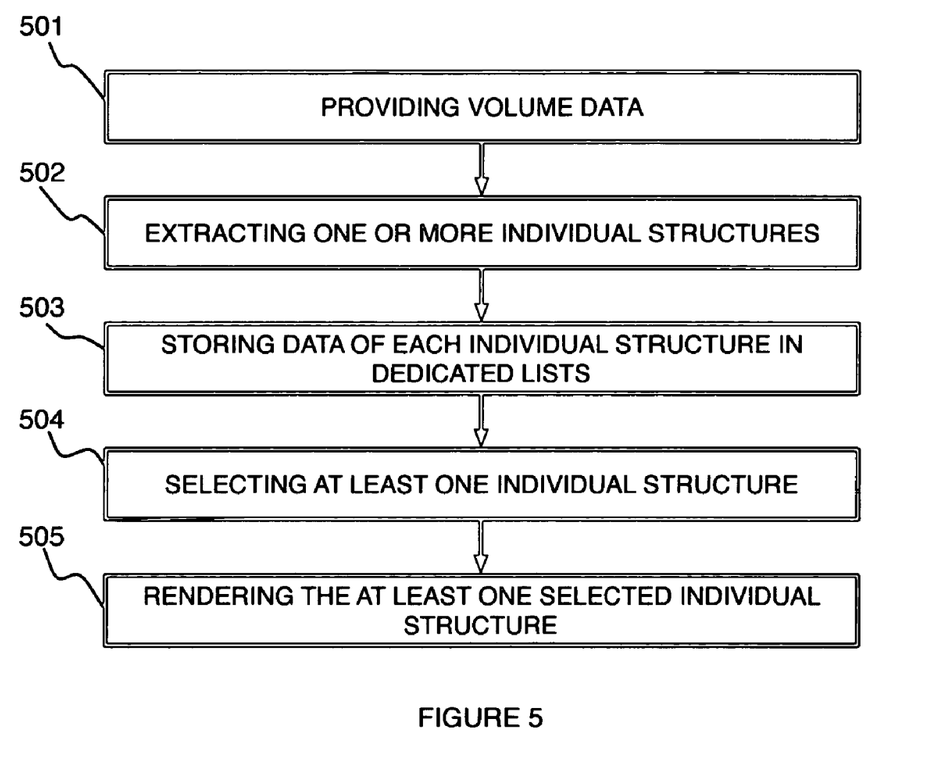
FIG. 5 is a flow chart of a method according to an embodiment of the present disclosure.

Referring to FIG. 5, a method for building an atlas includes providing a volume data of a thoracic cage 501, extracting individual bones from the volume data 502. For example, extracting a plurality of ribs from the volume data by ray tracing, and extracting a plurality of vertebra by level set method. The method includes storing locations of a plurality of voxels for each bone, wherein each bone is associated with a dedicated list of locations 503, wherein the locations are locations in a coordinate system of the volume data. The method includes selecting one or more of the bones for rendering 504, forming a selected structure. The method includes rendering the selected structure in the coordinate system of the volume data according to the dedicated list of locations of each rib and/or vertebra in the selected structure 505.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 6:
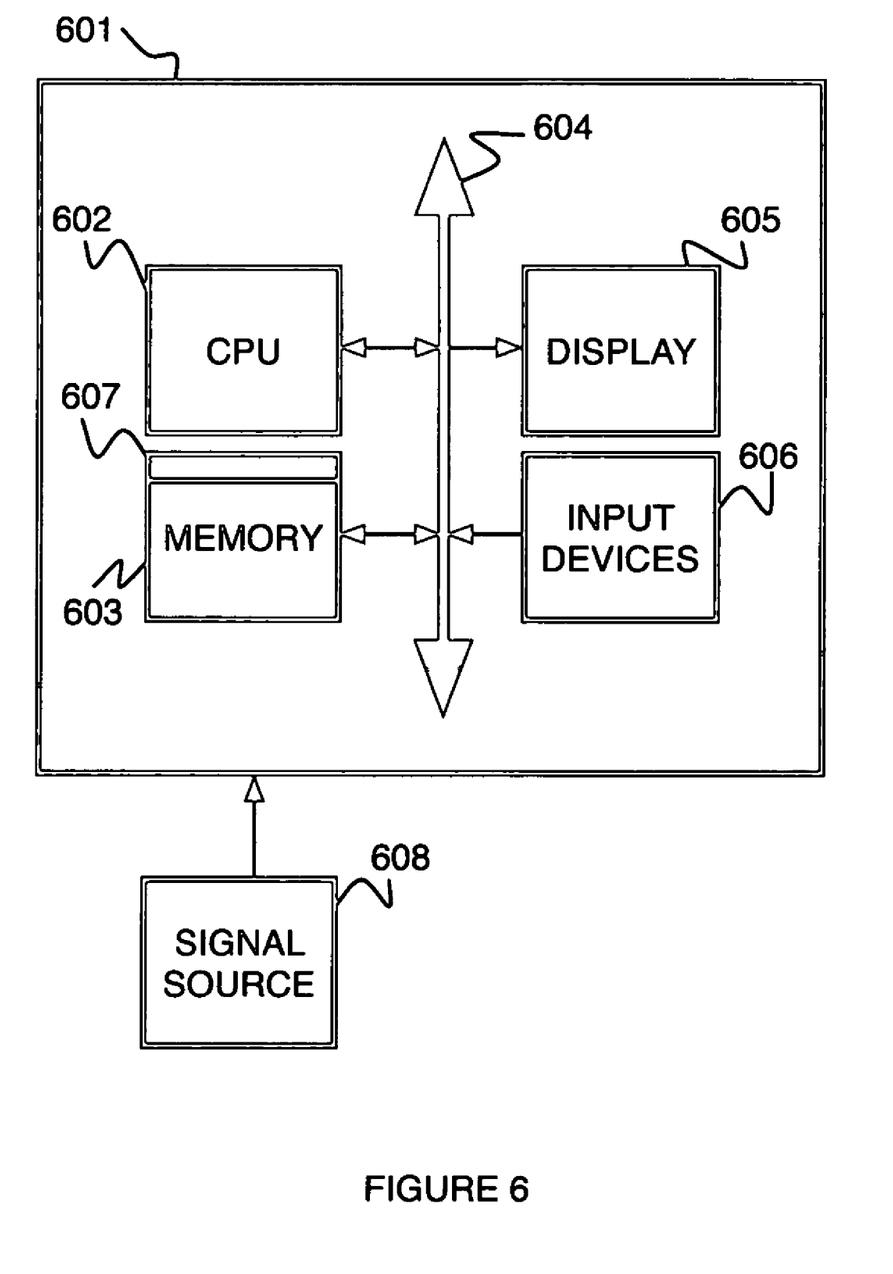
FIG. 6 is a diagram of a system according to an embodiment of the present disclosure.

Referring to FIG. 6, according to an embodiment of the present disclosure, a computer system 601 for implementing a method for an interactive atlas, inter alia, a central processing unit (CPU) 602, a memory 603 and an input/output (I/O) interface 604. The computer system 601 is generally coupled through the I/O interface 604 to a display 605 and various input devices 606 such as a mouse and keyboard. The display 605 can display views of the virtual volume and registered images. The support circuits can include circuits such as cache, power supplies, clock circuits, and a communications bus. The memory 603 can include random access memory (RAM), read only memory (ROM), disk drive, tape drive, etc., or a combination thereof. The present invention can be implemented as a routine 607 that is stored in memory 603 and executed by the CPU 602 to process the signal from the signal source 608. As such, the computer system 601 is a general purpose computer system that becomes a specific purpose computer system when executing the routine 607 of the present invention.

The computer platform 601 also includes an operating system and micro instruction code. The various processes and functions described herein may either be part of the micro instruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for an interactive skeletal atlas, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A system for building an atlas comprising:
   a memory device storing a volume data for a plurality of bones and a plurality of instructions for building the atlas;
   a processor for receiving the volume data for a plurality of bones and executing the plurality of instructions to perform a method comprising:
   segmenting, individually, the plurality of bones from the volume data;
   storing locations of a plurality of voxels for each of the plurality of bones, wherein each of the plurality of bones is registered with a dedicated list of locations, wherein the locations are locations in a coordinate system of the volume data;
   selecting one or more of the plurality of bones, forming a selected structure; and
   rendering the selected structure in the coordinate system of the volume data according to the dedicated list of locations of each of the plurality of bones in the selected structure, wherein a rendering is displayed by a display.

2. The system of claim 1, wherein the rendering is a surface rendering.

3. The system of claim 1, wherein the rendering is a volume rendering.

4. The system of claim 1, further comprising:
   segmenting a first bone using a tracing method; and
   segmenting a second bone using a level set method.

5. The system of claim 1, wherein a rendering of the selected structure is the atlas, wherein the processor executes the plurality of instructions to compare the atlas to a previously extracted atlas of a same patient.

6. The system of claim 1, further comprising:
   determining a rendering of the selected structure to have a pathology; and
   storing the locations of the plurality of voxels corresponding to the selected structure selected structures in a database of selected structures having the pathology or a plurality of pathologies.

7. A program storage device readable by machine, tangibly embodying a program of instructions executable by the machine to perform method steps for building an atlas, the method steps comprising:
   providing a volume data for a plurality of bones;
   segmenting, individually, the plurality of bones from the volume data;
   storing locations of a plurality of voxels for each of the plurality of bones, wherein each of the plurality of bones is registered with a dedicated list of locations, wherein the locations are locations in a coordinate system of the volume data;
   selecting one or more of the plurality of bones, forming a selected structure; and
   rendering the selected structure in the coordinate system of the volume data according to the dedicated list of locations of each of the plurality of bones in the selected structure, wherein a rendering is displayed by a display.

8. The method of claim 7, wherein the rendering is a surface rendering.

9. The method of claim 7, wherein the rendering is a volume rendering.

10. The method of claim 7, further comprising: segmenting a first bone using a tracing method; and segmenting a second bone using a level set method.

11. The method of claim 7, wherein a rendering of the selected structure is the atlas, the method further comprising comparing the atlas to a previously extracted atlas of a same patient.

12. The method of claim 7, further comprising:
   determining a rendering of the selected structure to have a pathology; and
   storing the locations of the plurality of voxels corresponding to the selected structure selected structures in a database of selected structures having the pathology or a plurality of pathologies.

13. A program storage device readable by machine, tangibly embodying a program of instructions executable by the machine to perform method steps for visualization of skeletal structures, the method steps comprising:
provide a volume data of a skeletal structure;
rendering a three-dimensional view of the skeletal structure in a first window;
selecting, individually, at least one bone of the skeletal structure forming a selected structure; and
rendering a three-dimensional view the selected structure in a second window.

14. The method of claim 13, wherein the three-dimensional view of the skeletal structure is a surface rendering and the three-dimensional view of the selected structure is a surface rendering.

15. The method of claim 13, wherein the three-dimensional view of the skeletal structure is a surface rendering and the three-dimensional view of the selected structure is a volume rendering.

16. The method of claim 13, wherein the three-dimensional view of the skeletal structure is a volume rendering and the three-dimensional view of the selected structure is a surface rendering.

17. The method of claim 13, wherein the three-dimensional view of the skeletal structure is a volume rendering and the three-dimensional view of the selected structure is a volume rendering.

* * * * *